Feb. 9, 1932.    J. O. ALMEN    1,844,454
LUBRICATING SYSTEM
Filed Nov. 5, 1928

Inventor
John O. Almen
By Blackmore, Spencer & Hulse
Attorneys

Patented Feb. 9, 1932

1,844,454

UNITED STATES PATENT OFFICE

JOHN O. ALMEN, OF ROYAL OAK, MICHIGAN, ASSIGNOR TO GENERAL MOTORS RESEARCH CORPORATION, OF DETROIT, MICHIGAN, A CORPORATION OF DELAWARE

LUBRICATING SYSTEM

Application filed November 5, 1928. Serial No. 317,207.

This invention relates to lubricating systems and has particular reference to a lubricating system applied to internal combustion engines used on automotive vehicles.

Internal combustion engines of automotive vehicles in modern practice are provided with an oil pan suspended from the crank case. An oil pump driven from the crank shaft is usually positioned in the oil pan and takes the oil from an inlet at the bottom of the pan and forces the lubricant to the various bearing or moving parts of the engine. In some instances a screen is provided which is positioned between the pump inlet and the body of the oil in the oil pan or in other words the lubricant must pass through the screen before it enters the pump. Due to the accumulation of dust and foreign matter in the oil pan there has been a tendency for the screen to clog and prevent the free passage of the oil.

It is an object of the present invention to devise a means which will prevent the clogging of the screen and allow the ready passage of the lubricant.

The object of the invention is accomplished by placing the screen close to the bottom of the oil pan and allowing it to extend preferably over the entire bottom of the pan. Connected to the usual by-pass or pressure relief valve of the pump is a conduit or pipe line extending preferably centrally longitudinally over the screen and being provided with a suitable number of nozzles which will cause the oil to squirt in a rather fine stream over the surface of the screen and tend to remove any clogging material.

Figure 1:
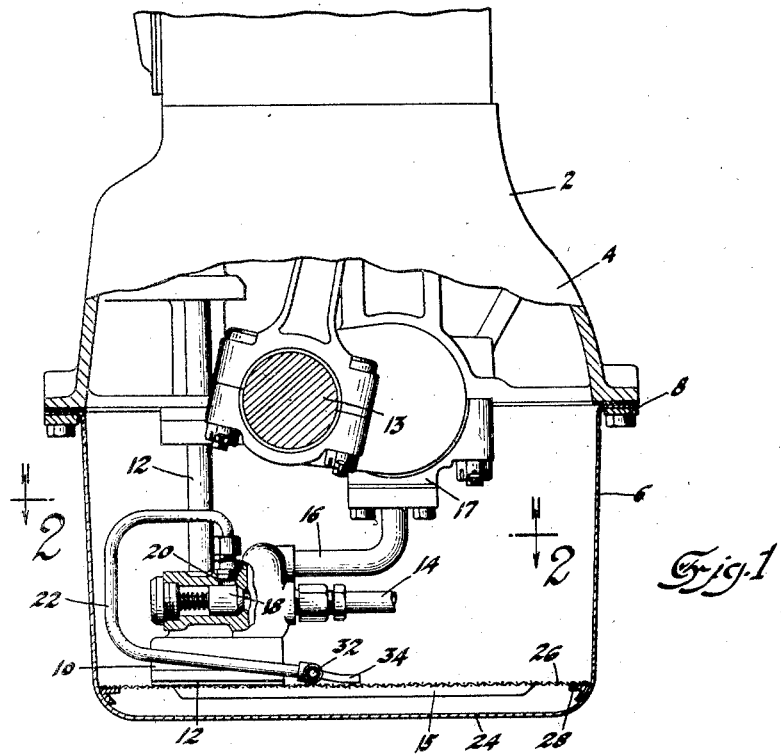
Figure 1 is an end view of an internal combustion engine with parts broken away and shown in section to illustrate the invention.

Referring to the drawings, the numeral 2 indicates an internal combustion engine as a whole, 4 the crankcase, 6 the oil-pan connected at 8 to the crankcase, 10 the usual oil pump driven from the shaft 12 receiving its power from the camshaft or the crankshaft 13, in a well known way.

The oil pump 10 in the usual construction is provided with an inlet adjacent its bottom 12. In the present construction, which is taken from a Buick automobile, the inlet receives its oil from a small screened inclosure, the frame of which is shown at 15. From the inlet the oil is passed to the manifold 16 which delivers the oil to the crankshaft bearings 17 and other parts of the engine. An auxiliary feed-line is shown at 14 leading to other bearing parts of the engine.

The pump 10 is provided with the usual spring pressed pressure relief or by-pass valve 18 to allow for the exit of the oil when the pressure in the system becomes excessive. Connected to the outlet 20 of the pressure relief valve is a pipe or conduit 22 which permits the return of the by-passed oil to the oil-pan.

Positioned at the bottom of the oil-pan and spaced somewhat from its bottom 24 is a foraminous member 26 in the form of a screen. Side and end brackets or angle pieces 28 are preferably provided to form a support for the screen 26. The member 26, it will be noted, is between the main body of the oil above the screen and the pump inlet; in other words, the screen may be stated to be over the inlet.

Connected to the end of the outlet pipe 22 by means of the T joint 30 is a conduit or pipe 32 in the form of a manifold. The pipe 32, as is better shown in Fig. 1, is positioned over the screen 26 and while it is shown in contact therewith in Fig. 1 it may be slightly spaced from the upper surface. The manifold 32 preferably extends longitudinally centrally of the screen 26 at both sides of the pump 10 which is preferably positioned at the mid position of the oil pan. If desired, the oil pump may be positioned at the end of the oil pan and the manifold extend in one direction only.

Figure 2:
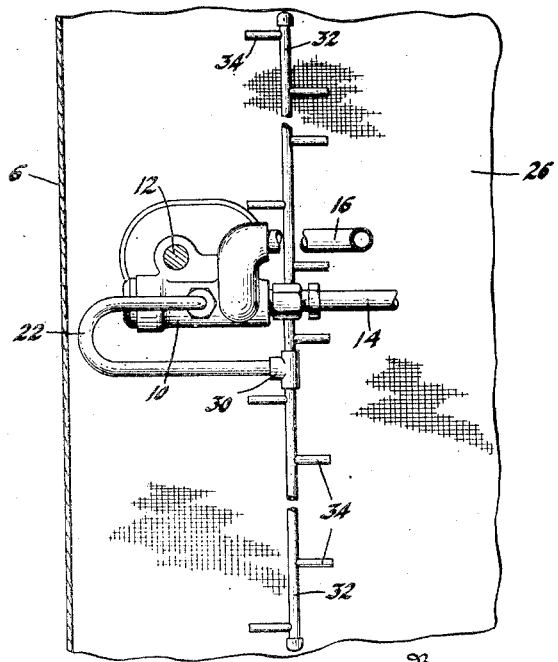
Figure 2 is a sectional plan view on the line 2—2 of Figure 1.

At both sides of the manifold as is best shown in Fig. 2, a plurality of nozzles 34 is provided. The nozzles are preferably provided with end openings only but may have lateral openings as well. The oil which is by-passed from the pressure relief valve 18 is delivered into the pipe 22 and then into the manifold 32 from which it passes under pressure in a relatively fine stream from the end of the nozzles 34 and is sprayed or shot over the screen 26 and therefore tends to remove any clogging material. The force of the oil stream is sufficient to wash away any material which tends to clog the screen.

I claim:

1. In combination with an engine having a lubricating system, including an oil pan, a pump for moving the lubricant, pressure relief means for by-passing the lubricant, a screen, and means for causing the by-passed lubricant to prevent clogging of the screen.

2. In combination with an engine having a lubricating system including an oil pan, a pump for moving the lubricant, means at the pump for by-passing some of the lubricant, a straining means over the pump inlet, and means for causing the by-passed oil to prevent clogging of the straining means.

3. In combination with an engine having a lubricating system, including an oil pan, a pump for moving the lubricant, means for by-passing a portion of the pumped oil, a screen over the pump inlet, and a conduit for delivering the lubricant on the screen to prevent clogging.

4. In combination with an engine having a lubricating system including an oil pan, a pump for moving the lubricant, means for by-passing a portion of the pumped oil, a foraminous element over the pump inlet, and a conduit for delivering the by-passed lubricant under pressure to the foraminous member to prevent clogging.

5. In combination with an engine having a lubricating system including an oil pan, a pump for moving the lubricant, means for by-passing a portion of the pumped oil, a foraminous element over the pump inlet, a pipe for receiving the by-passed oil, and a plurality of members connected to said pipe to force the lubricant under pressure onto the said element to prevent clogging.

6. In combination with an engine having a lubricating system including an oil pan, a pump for moving the lubricant, means for by-passing a portion of the pumped oil, a foraminous element over the pump inlet, a pipe for receiving the by-passed oil, and a plurality of nozzles connected to said pipe to force the lubricant under pressure onto the said element to prevent clogging.

7. In combination with an engine having a lubricating system including an oil pan, a pump for moving the lubricant, means for by-passing a portion of the pumped oil, a foraminous element over the pump inlet, a pipe for receiving the by-passed oil, and a plurality of members connected to said pipe to force the lubricant under pressure onto the said element to prevent clogging, said pump located at the mid portion of said oil pan and said pipe extending in opposite directions from said pump.

8. In combination with an engine having a lubricating system including an oil pan, a pump for moving the lubricant, pressure relief means for by-passing the lubricant, a screen, and means for forcing the by-passed lubricant over the screen under pressure to prevent clogging of the screen.

In testimony whereof I affix my signature.

JOHN O. ALMEN.